(No Model.) 2 Sheets—Sheet 1.

F. A. JONES.
PRESSURE INDICATING AND RECORDING GAGE.

No. 594,881. Patented Dec. 7, 1897.

WITNESSES:
Edgar B. Hill
Philip H. Gors.

INVENTOR:
Florentine A. Jones

THE NORRIS PETERS CO., PHOTO-LITHO., WASHINGTON, D. C.

(No Model.) 2 Sheets—Sheet 2.

F. A. JONES.
PRESSURE INDICATING AND RECORDING GAGE.

No. 594,881. Patented Dec. 7, 1897.

WITNESSES:

INVENTOR:

UNITED STATES PATENT OFFICE.

FLORENTINE A. JONES, OF MALDEN, MASSACHUSETTS.

PRESSURE INDICATING AND RECORDING GAGE.

SPECIFICATION forming part of Letters Patent No. 594,881, dated December 7, 1897.

Application filed January 21, 1895. Serial No. 535,632. (No model.)

*To all whom it may concern:*

Be it known that I, FLORENTINE A. JONES, of Malden, in the county of Middlesex and State of Massachusetts, have invented a new and useful Improvement in Pressure Indicating and Recording Gages, of which the following, taken in connection with the accompanying drawings, is a specification.

My invention relates to improvements in pressure-gages by which pressure or vacuum may be indicated on a dial or suitably enumerated or recorded on a chart or suitable recording-surface by means of usual and well-known mechanism operated by a hollow tube, and particularly relates to the connection between the said tube and the mechanism whereby the motion of the tube is imparted to the mechanism.

The objects of my invention are to simplify and render more positive in their action the means connecting the end of the hollow or Bourdon tube with any suitable gage mechanism, to the end that the slightest variances or differences in pressure are indicated or recorded with the highest degree of accuracy, and to render the connection less liable to become inoperative under unfavorable circumstances from rust, corrosion, or other like causes by decreasing the number of movable parts and decreasing the friction-surfaces.

To these ends my invention consists in the improvements which I shall now describe more particularly, and then set forth in the claims hereto appended.

Figures 1, 3, 4:
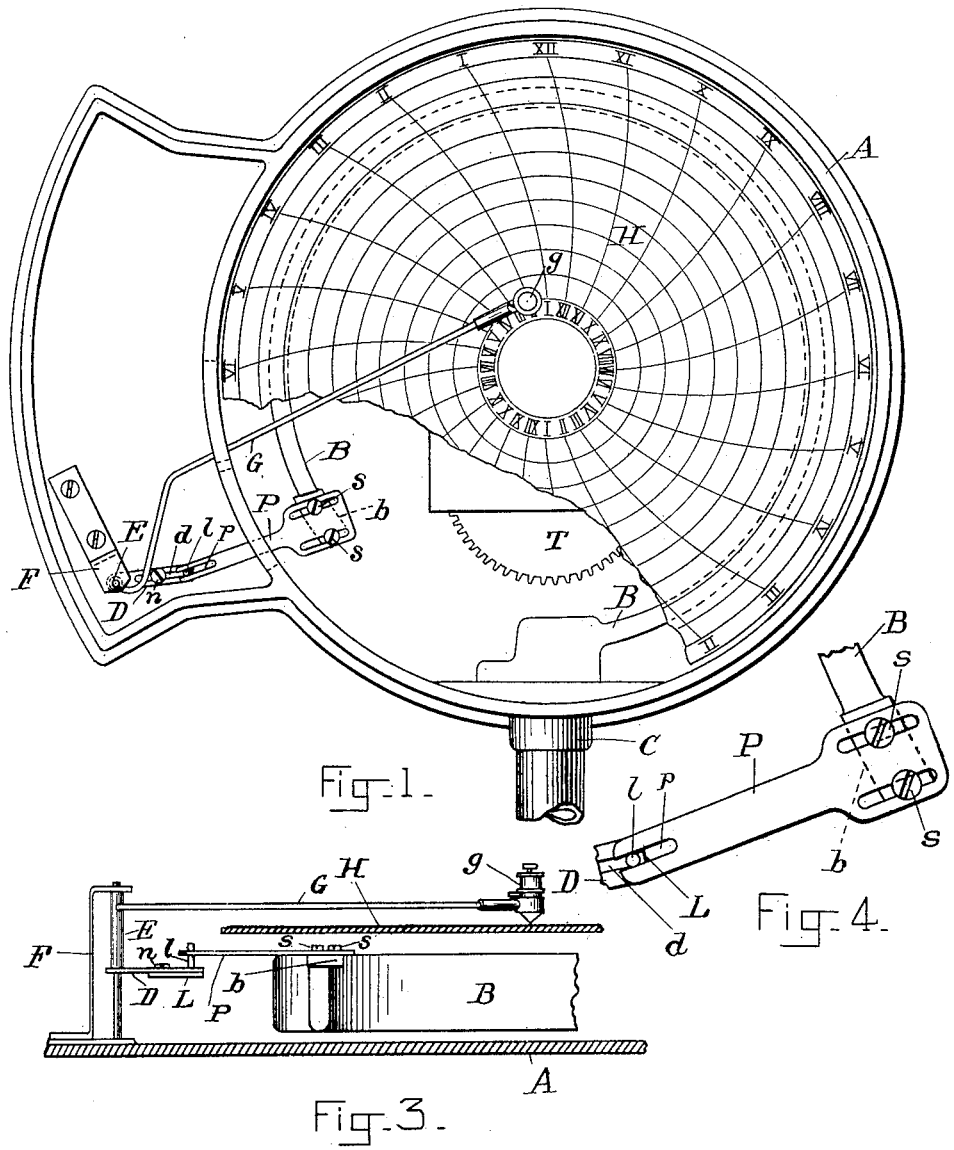
Figure 2:
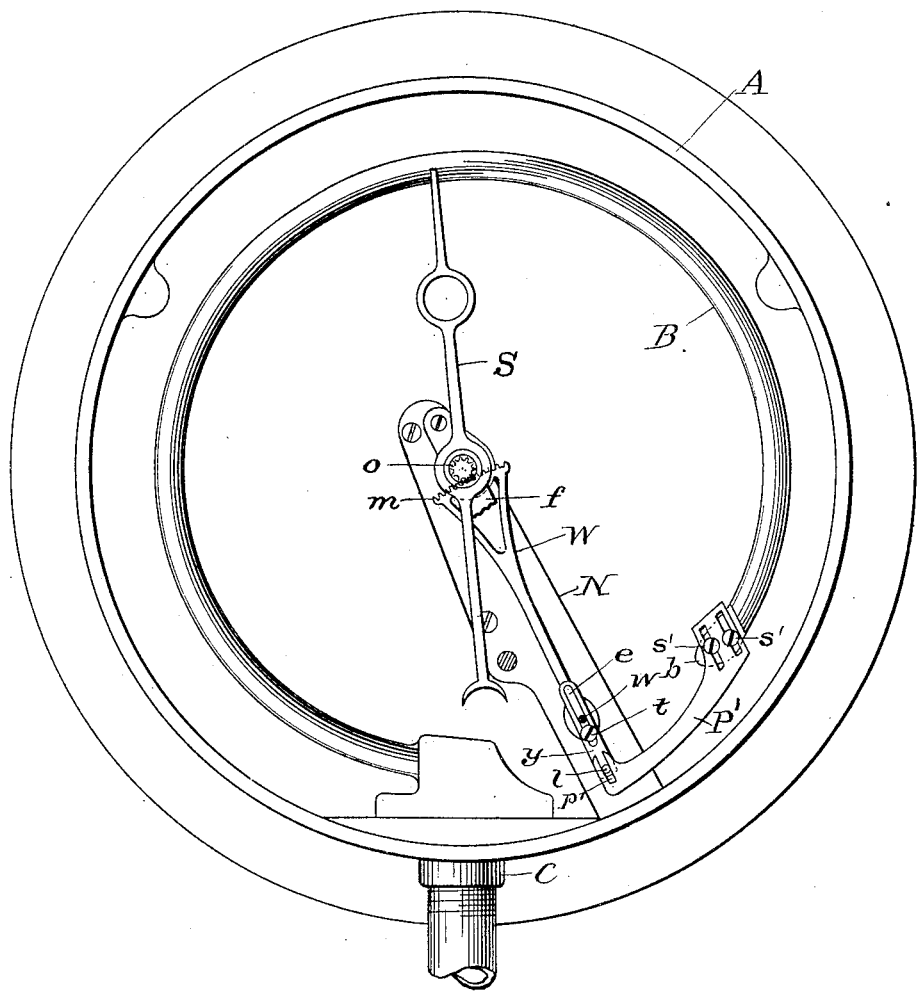

Of the drawings, Figure 1 is a plan view of a pressure-gage provided with a recording mechanism having a portion of the chart or dial broken away, so as to disclose the same as being equipped with my improvements.
Fig. 2 is a plan view of the interior of a pressure-gage provided with an indicating mechanism, also provided with my improvements. Fig. 3 is a partial section through Fig. 1, so as to illustrate the power or motion transmitting mechanism in side view. Fig. 4 shows in detail the connection between the hollow tube and the transmitting pin or projection of the mechanism.

Referring to the drawings, A, Fig. 1, indicates the casing of a recording pressure-gage having a Bourdon tube B, with its inlet-pipe C fixed therein in the usual manner. The gage is provided with a dial or chart H, on which a marking or delineating device $g$ traces lines indicating the variations in the pressure, as evidenced by the spring-tube B, and which chart is revolved in the usual way by clockwork, (indicated by T.) The marking device is on the end of a lever G, which is secured at its other end to an arbor E, pivoted in suitable bearings in the frame F. The arbor E has also a transmitting-arm D attached to and projecting out from it, and this arm is provided in its outer or free end with a slot $d$ for the purpose of fixing thereon the adjusting-piece L, which is provided with a transmitting pin or projection $l$, passing through the said slot and extending above the arm D, and a screw $n$ also passes through the said slot and enters the adjusting-piece L for the purpose of clamping the adjusting-piece at any point to the arm D. The pin and the screw connect the adjusting-piece practically rigidly with the arm D, so that it forms, as it were, a part of the same, while at the same time they permit of an easy adjustment of the said piece toward and from the arbor E to obtain the necessary movement of the marking device $g$ on the chart or dial H.

It will be observed that the continuation of the indicating-lever G beyond the arbor E would be the equivalent of the arm D and be equally practicable and fulfil all the functions of the arm D.

The marking device, the lever G and its arbor, which I include in the term "gage mechanism," are well known and are connected with the end of the Bourdon tube by the following motion or power transmitting devices: To the tip or free end of the Bourdon tube B, I adjustably but rigidly and immovably attach a connecting-arm or extension-piece P by means of screw $s\ s$, passing through longitudinal slots in the extension-piece and entering the tip. The outer free end of the extension-piece is provided with a longitudinal slot $p$ transverse to its path of movement, into which the transmitting pin or projection $l$ extends and in which it freely and operatively slides. The extension thus forms, as it were, a part of the Bourdon tube. It will now be seen that the movement of the end of the spring-tube will be transmitted to the gage mechanism through the means just described and that there will be no lost motion.

In Fig. 2 I have shown my invention as applied to a pressure-indicating gage, the upper plate f of the frame N being broken off to show the mechanism by which the indicator or pointer S is operated, as well as to afford a better view of my improved connection of the mechanism with the Bourdon tube B. The pointer S is fixed upon an arbor suitably pivoted in the frame N and provided with a pinion o, by means of which the pointer is revolved and indicates upon a suitably-enumerated dial (not shown) the pressure. The pinion o engages with the teeth m of a segmental rack W, which is fixed upon an arbor suitably pivoted at w in the frame N. The segmental rack has at its rear a transmitting-arm carrying an adjusting-piece y, which is provided with a longitudinal slot e, through which the arbor of the segmental rack and its pivot w project, and by means of which and the clamping-screw t the adjusting-piece y is firmly and immovably fixed to the segmental rack; but it will be seen that upon loosening the clamping-screw t the adjusting-piece by means of its slot e may be slid in or out along the arm and in effect shorten or lengthen the end of the segmental rack W, and thus the movement of the rack and the pointer S may be increased or diminished, as desired.

The above-described device is the usual and well-known mechanism used in pressure-indicating gages and is termed the "gage movement or mechanism."

The pointer S and its arbor, together with the pinion o and the segmental rack W with its arbor, all of which I include in the term "gage mechanism," are connected with the free end of the Bourdon tube by the following motion or power transmitting devices.

It will be observed that I fix a transmitting pin or projection l in the outer end of the adjusting-piece y, and to the tip or free end of the Bourdon tube B, I adjustably but rigidly and immovably attach a connecting-arm or extension-piece P' by means of clamping-screws s' s', which, passing through transverse slots in the said extension-piece, enter the tip. It will be observed that in this case the extension P' extends in the direction of the tube, while in the recording pressure-gage the extension-piece P is transverse thereto, the slots in both cases being transverse to the said tube.

The outer free end of the extension-piece is provided with a slot p' transverse to its path of movement, into which the transmitting pin or projection l of the adjusting-piece y extends and in which it freely and operatively slides. The extension thus forms, as it were, a part of the Bourdon tube. Any movement of the Bourdon tube will be transmitted to the pointer through the devices just described.

I have illustrated but two forms or kinds of mechanism used in pressure-gages, but my device for connecting a hollow tube with the gage mechanism shown is equally adapted to impart the motion of a hollow tube to other pressure-gage mechanisms.

It will be seen upon examination of the devices that directly connect the tube with the mechanism illustrated in Figs. 1 and 2 that they consist of the same parts connected in the same manner and operating in the same way; also, that they may be very finely adjusted and that the frictional parts and surfaces are so small and so few that corrosion will not appreciably affect the working of the gages.

The extension on the end of the Bourdon tube may be adjusted transversely thereof and held firmly and immovably fixed in any desired position by means of the screws and slots before described. The mechanism is operated by the extension-piece by means of the operatively-sliding engagement of the pin on one of the parts, which freely enters a slot in the other part. The operatively-sliding engagement of the pin in the slot operates to prevent any binding or sticking due to corrosion or otherwise, since none of the parts are pivoted together, as is the case with all other gages of which I have knowledge.

Having now explained the nature of my invention and described a way of constructing and using the same, although without attempting to set forth all of the forms in which it may be made or all of the modes of its use, what I claim, and desire to secure by Letters Patent, is—

1. A pressure-gage, comprising a hollow spring-tube, an extension rigidly and immovably fixed to the free end of said tube and provided with a slot arranged at an angle to the path of its movement, and a suitable gage mechanism having an arbor journaled at both ends in suitable bearings and provided with a transmitting-arm rigidly fixed to said arbor, and also provided with a pin or projection engaged with and freely and operatively sliding in said slot.

2. A pressure-gage, comprising a hollow spring-tube, an extension rigidly and immovably fixed to the free end of said tube, a suitable gage mechanism having an arbor journaled at both ends in suitable bearings and provided with a transmitting-arm rigidly fixed to said arbor, and a connection between the extension and the transmitting-arm, comprising a slot in one of said parts arranged at an angle to the path of its movement, and a pin or projection carried by the other part and engaging with and freely and operatively sliding in said slot.

3. In a pressure-gage, the combination with a hollow spring-tube, a suitable gage mechanism having an arbor journaled at both ends in suitable bearings and provided with a transmitting-arm rigidly fixed to said arbor and a power-transmitting pin or projection on said arm, of an extension rigidly and immovably fixed to the free end of the tube and provided with a slot arranged at an angle to the path of its movement and in which said pin or projection engages and freely and operatively slides.

4. In a pressure-gage, the combination with a hollow spring-tube, and a movable gage mechanism, of an adjustable extension mounted on the free end of the spring-tube and having a slot in its outer end arranged at an angle to the path of movement, means for positively securing said extension in any position to which it may be adjusted, a transmitting-arm provided with a pin or projection engaged with and freely and operatively sliding in said slot, and an arbor journaled at both ends in suitable bearings and to which said transmitting-arm is rigidly fixed.

5. In a pressure-gage the combination with a hollow spring-tube and suitable gage mechanism provided with a sliding or adjusting piece having a pin or projection, of an extension provided with a slot arranged at an angle to its path of movement, said extension being rigidly and immovably fixed to the free end of said tube, and said pin or projection engaging with the slot and freely and operatively sliding therein.

6. In a pressure-gage the combination with a hollow spring-tube and a movable gage mechanism, of an extension adjustably mounted on the free end of the Bourdon tube, means for positively securing it in any position to which it may be adjusted, said extension having a slot in its outer end arranged at an angle to the path of its movement, and a transmitting-arm operatively connected with the gage mechanism and provided with a longitudinally-adjustable piece having a pin engaged with and freely and operatively sliding in said slot.

7. A pressure-gage comprising a hollow spring-tube provided with an extension rigidly and immovably fixed to the free end of said tube, a suitable gage mechanism provided with a sliding adjustable piece, and a connection between the extension and the sliding adjustable piece comprising a slot in one of said parts arranged at an angle to the path of its movement, and a pin or projection carried by the other part and engaging with and freely and operatively sliding in said slot.

8. In a gage, the combination with a hollow spring-tube and the gage mechanism, of an extension secured to the tube and provided with a slot, and a slide mounted on the mechanism and provided with a pin engaging with said slot, substantially as set forth.

9. In a gage, the combination with the gage mechanism and a hollow spring-tube provided at its movable free end with a slotted extension, of a slotted slide arranged on the mechanism and provided with a pin engaging with the slot in said extension, and a fastening-screw arranged in the slot of the slide and securing the slide to the mechanism, the slots in said extension and slide being arranged in line or parallel to one another and substantially at right angles to the path of the extension, substantially as set forth.

10. A pressure-recording gage, comprising a hollow spring-tube having a lateral extension rigidly fixed thereto, said extension being provided with a slot arranged at an angle to the path of its movement, an arbor, a recording-arm provided with a marking device and movable about the axis of said arbor, and a transmitting-arm rigidly connected to said recording-arm, and having a pin entering and sliding in the slot in the said extension.

In testimony whereof I have signed my name to this specification, in the presence of two subscribing witnesses, on this 19th day of January, A. D. 1895.

FLORENTINE A. JONES.

Witnesses:
EDGAR S. HILL,
PHILIP H. GOSS.